UNITED STATES PATENT OFFICE.

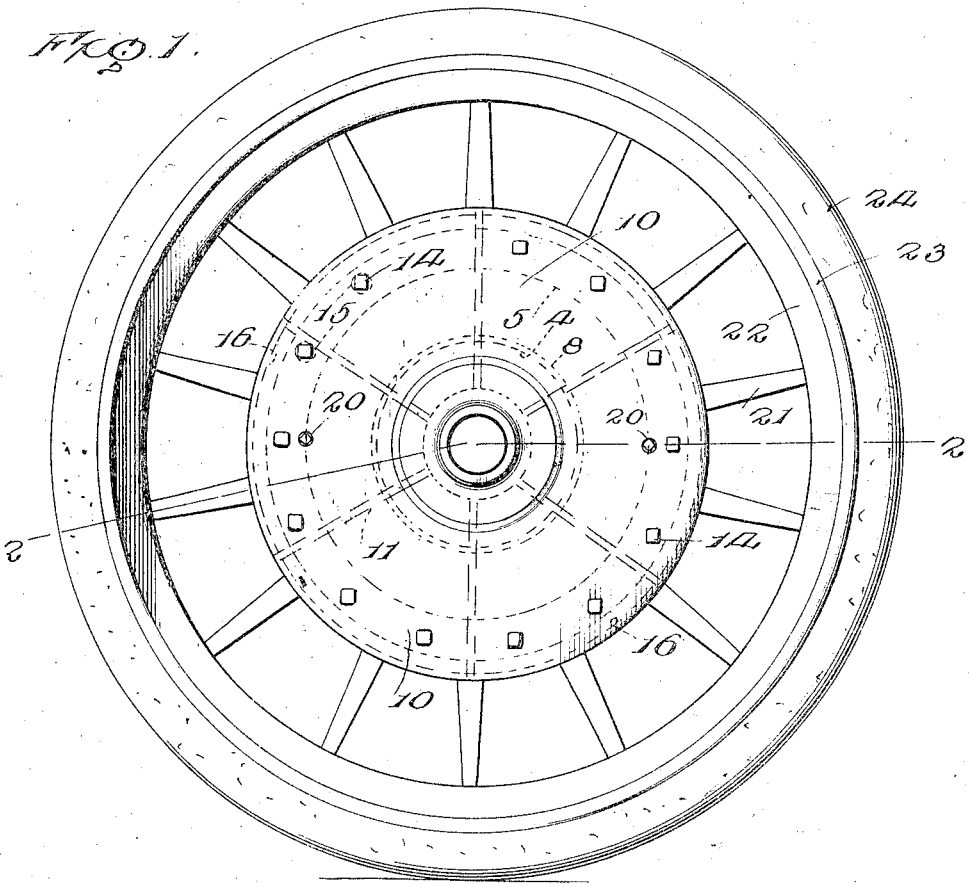

OTTO P. DOWNING, OF PECOS, TEXAS.

PNEUMATIC WHEEL.

993,659. Specification of Letters Patent. Patented May 30, 1911.

Application filed April 25, 1910. Serial No. 557,583.

*To all whom it may concern:*

Be it known that I, OTTO P. DOWNING, citizen of the United States, residing at Pecos, in the county of Reeves and State of Texas, have invented certain new and useful Improvements in Pneumatic Wheels, of which the following is a specification.

The present invention comprehends certain new and useful improvements in vehicle wheels, and the invention has for its object an improved pneumatic wheel including a pneumatic tube or cushion which is effectually mounted intermediate of the hub and rim and affords the wheel maximum resiliency of structure so as to insure of the absorption of the shocks incident to travel.

A further object of the invention is a wheel of this character which possesses to a marked degree the characteristics of simplicity, durability and efficiency, which is both strong and light, and which consists of comparatively few parts and is not likely to get out of order.

With these and other objects in view as will more fully appear as the description proceeds, the invention consists in certain constructions, arrangements and combinations of the parts that I shall hereinafter fully describe and claim.

For a full understanding of the invention and the merits thereof and also to acquire a knowledge of the details of construction, reference is to be had to the following description and accompanying drawing, in which:

Figure 1 is a side elevation of a wheel constructed in accordance with my invention; Fig. 2 is a section on the line 2—2 of Fig. 1; Fig. 3 is an enlarged fragmentary sectional view.

Corresponding and like parts are referred to in the following description and indicated in all the views of the drawing by the same reference characters.

My improved vehicle wheel includes a hub 1, which is preferably in the form of a metallic shell, the central portion of which constitutes an axle boxing 2. The boxing is interiorly enlarged at its opposite ends in the usual manner, and the inner end of the boxing is extended beyond the inner end of the body portion of the hub, as shown.

The hub is formed in its periphery with a continuous concave groove 4 that is arranged in opposed relation to a continuous groove 5 formed in the inner surface of an annular frame or spoke ring 6 which encircles the hub in spaced relation thereto. The grooves 4 and 5 co-act to constitute a seat for a pneumatic tube or cushion 7, the function of which is to yieldably support the frame 6 from the hub. The hub is cut-away as at 8 substantially flush with the bottom of the groove 4, at the outer side of such groove, in order to provide a comparatively wide entrance into the seat to permit the pneumatic tube to be conveniently moved laterally into or out of position, according as desired.

The annular frame 6 is movable between two side plates or disks 9 and 10 that project outwardly from the hub on opposite sides of the groove 4 and in substantially parallel relation. The side plate 9 is disposed on the inner side of the groove and is rigid with the hub and is substantially flush with the inner end thereof. Reinforcing webs or ribs 11 radiate from the extended inner end of the boxing 2 and extend across the inner end of the hub and the side plate 9, whereby to materially strengthen the structure of the wheel. The other side plate 10 is separate from the hub and is detachably secured thereto in any suitable manner. In the present instance, the hub is reduced and exteriorly threaded, as indicated at 12, between its outer end and the cut-away portion 8, and the side plate is interiorly threaded to screw on this reduced portion. The side plate is formed with an inwardly projecting annular rib 13 that fits snugly around the cut-away portion 8, the rib being wedge-shaped in cross section so as to force the pneumatic tube 7 against the side plate 9 and to hold the pneumatic plate firmly seated in the grooves 4 and 5.

The outer portions of the side plates are connected together at suitable intervals by a plurality of bolts 14 which pass through preferably circular openings 15 in the annular frame 6. The bolts prevent the side plates from spreading apart and in addition to this function also serve to limit any rotary movement of the frame 6 relative to the hub. The openings 15 are, of course, sufficiently large to afford the bolts necessary play upon the yielding movement of the frame 6 toward and away from the hub.

In order to cause the frame 6 to move freely between the side plates 9 and 10, I provide packing rings 16, of felt or the like, which are received in continuous grooves 17 formed in the side faces of said frame. Suitable springs 18 are also mounted within the grooves 17 and force the packing rings against the adjacent faces of the side plates to insure against the admission of dust or other foreign matter between the parts. As a further expedient, the side plates have their opposing faces recessed, as indicated at 19, between the packing joints and the hub 1 so as to be spaced apart from the sides of the frame 6 to provide oil spaces or chambers into which the lubricant may be introduced through one or more inlets 20 formed in each of the side plates, the inlets being normally closed by screw plugs.

The annular frame 6 is preferably hollow for the sake of lightness. Extending radially from this frame is a series of spokes 21 that are secured to the rim 22 of the wheel. A metallic band 23 encircles the rim and has a tire or tread 24 of solid rubber fitted therearound.

From the foregoing description in connection with the accompanying drawing, it will be apparent that in the practical operation of a wheel constructed in accordance with my invention, the pneumatic tube will permit the circumferential portion of the wheel to yield to accommodate itself to any unevenness of the ground and to effectually absorb the shocks incident to travel and thus supplement the action of the vehicle springs. The wheel will be found particularly desirable for use on automobiles or like motor-driven vehicles, but it is to be understood that it is not limited to any such use but is susceptible of general application.

The inflation cushion 25 of the pneumatic tube 7 passes into the interior of the hollow hub with its extremity projecting through and beyond the inner end of the hub and housed within line of the reinforcing webs 11, as illustrated in Fig. 2. The inflation tube is thus rendered readily accessible when desired for use, and at the same time is effectually protected against accidental injury.

Having thus described the invention, what is claimed as new is:

A wheel including a hub having a continuous peripheral groove, a frame encircling the hub and formed in its inner surface with a continuous groove co-acting with the first-named groove to constitute a seat, a pneumatic tube fitted in said seat to yieldably support the frame from the hub, the hub being cut-away on one side of the groove therein to provide an enlarged entrance to the seat, side plates projecting outwardly from the hub on opposite sides of the first-named groove and confining the frame therebetween, one of the side plates being rigid with the hub and the other side plate being detachably secured thereto, a plurality of spokes radiating from the frame, and a rim secured to the spokes, the detachable plate being formed with an inwardly projecting annular rib encircling the cut-away portion of the hub and wedge-shaped in cross section and fitting against the pneumatic tube to hold the same firmly seated in the co-acting grooves.

In testimony whereof, I affix my signature in presence of two witnesses.

OTTO P. DOWNING. [L. S.]

Witnesses:
J. F. McKenzie,
S. D. Collings.